(12) United States Patent
Hirose et al.

(10) Patent No.: US 11,760,423 B2
(45) Date of Patent: Sep. 19, 2023

(54) PANEL MEMBER

(71) Applicant: NIPPON STEEL CORPORATION, Tokyo (JP)

(72) Inventors: Satoshi Hirose, Tokyo (JP); Keiichi Sato, Tokyo (JP); Yoshimichi Kawai, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 256 days.

(21) Appl. No.: 17/274,090

(22) PCT Filed: Sep. 13, 2019

(86) PCT No.: PCT/JP2019/036179
§ 371 (c)(1),
(2) Date: Mar. 5, 2021

(87) PCT Pub. No.: WO2020/054859
PCT Pub. Date: Mar. 19, 2020

(65) Prior Publication Data
US 2021/0197899 A1    Jul. 1, 2021

(30) Foreign Application Priority Data
Sep. 14, 2018  (JP) ................................. 2018-172238

(51) Int. Cl.
*B62D 25/20* (2006.01)
*B62D 21/15* (2006.01)
(52) U.S. Cl.
CPC .............. *B62D 25/20* (2013.01); *B62D 21/15* (2013.01)

(58) Field of Classification Search
CPC ................................. B62D 25/20; B62D 21/15
(Continued)

(56) References Cited

U.S. PATENT DOCUMENTS 7,404,593 B2 *   7/2008   Cormier .................... B32B 3/28
                                                293/133
2002/0017805 A1   2/2002   Carroll, III et al.
(Continued)

FOREIGN PATENT DOCUMENTS

JP        2005-59817 A     3/2005
JP        2005-514560 A    5/2005
(Continued)

*Primary Examiner* — Joseph D. Pape
*Assistant Examiner* — Dana D Ivey
(74) *Attorney, Agent, or Firm* — Birch, Stewart, Kolasch & Birch, LLP (57) ABSTRACT

To improve the collision performance of a panel member of an automobile. A panel member 1 includes a plurality of circular recessed parts 10 linearly arranged, wherein: when it is assumed that a portion where three recessed parts 10 are linearly aligned is called a recessed part group G, there are at least a first recessed part group $G_1$ and a second recessed part group $G_2$ arranged in parallel with the first recessed part group $G_1$; and an angle formed between a first straight line $L_1$ linking a center of the recessed part 10 in the first recessed part group $G_1$ and a center of the recessed part 10 in the second recessed part group $G_2$ located at a position closest to the recessed part 10, and, a second straight line $L_2$ linking centers of the recessed parts 10 in the first recessed part group $G_1$ is 80 degrees or more and 100 degrees or less.

4 Claims, 8 Drawing Sheets

(58) Field of Classification Search
USPC .................................................. 296/193.07
See application file for complete search history.

(56) References Cited

U.S. PATENT DOCUMENTS

| | | |
|---|---|---|
| 2002/0142129 A1 | 10/2002 | Chaudhry |
| 2005/0040677 A1 | 2/2005 | Kamura et al. |
| 2018/0273114 A1 | 9/2018 | Sanai et al. |

FOREIGN PATENT DOCUMENTS

| | | | | |
|---|---|---|---|---|
| JP | 2010-23326 A | | 2/2010 | |
| JP | 2013-27924 A | | 2/2013 | |
| JP | 2013027924 A | * | 2/2013 | |
| JP | 2017-61275 A | | 3/2017 | |
| JP | 2017061275 A | * | 3/2017 | ............. B62D 25/20 |
| WO | WO 00/35612 A2 | | 6/2000 | |
| WO | WO-0035612 A2 | * | 6/2000 | ............. B21D 47/00 |

* cited by examiner

| CONVENTIONAL ARRANGEMENT(a) | CONVENTIONAL ARRANGEMENT(b) | ARRANGEMENT IN EMBODIMENT |

(COMPARATIVE EXAMPLE: WITHOUT RECESSED PART)

FIG.7

(INVENTIVE EXAMPLE: WITH RECESSED PART, $\theta = 90°$)

PANEL MEMBER

CROSS-REFERENCE TO RELATED APPLICATIONS

This application is based upon and claims the benefit of priority of the prior Japanese Patent Application No. 2018-172238, filed in Japan on Sep. 14, 2018, the entire contents of which are incorporated herein by reference.

TECHNICAL FIELD

The present invention relates to a panel member of an automobile.

BACKGROUND ART

A vehicle body of an automobile is required to be improved in collision performance and reduced in weight. The collision performance is secured mainly by a member such as a side member, a side sill or the like constituting a frame of the vehicle body. To further improve the collision performance, there are methods of increasing the plate thickness of the material of the frame and providing a reinforcing member at the frame, but those methods are not preferable in terms of weight reduction. On the other hand, to improve the collision performance, there is, for example, a conceivable method of increasing a resistance force against a collision in, for example, a panel member such as a floor panel connecting to the side sill.

Patent Document 1 discloses a floor panel in which circular recessed parts are arranged in a honeycomb shape in a floor panel main body portion, and the recessed parts are coupled by ribs. Patent Document 2 discloses a floor panel in which circular rigidity adjustment parts are provided at a front part in the vehicle length direction.

Besides, Patent Document 3 discloses a composite module-type energy absorbing assembly effectively absorbing energy in various apparatuses, and discloses a constitution in which, for example, a plurality of circular recessed parts are arranged in parallel (see FIG. 3, FIG. 11 and so on of Patent Document 3).

PRIOR ART DOCUMENT

Patent Document

Patent Document 1: Japanese Laid-open Patent Publication No. 2017-061275
Patent Document 2: Japanese Laid-open Patent Publication No. 2005-059817
Patent Document 3: Japanese Translation of PCT International Application Publication No. 2005-514560

DISCLOSURE OF THE INVENTION

Problems to be Solved by the Invention

In the Small Over Lap test being a kind of a collision test, a load is input from the front in the vehicle length direction of the side sill, and a shear force occurs in the floor panel. When out-of-plane deformation occurs in the floor panel accompanying the above, buckling in a shear direction (hereinafter "shear buckling") is induced, and when large shear buckling occurs in the floor panel in this event, the degree of contribution of the floor panel in terms of improving the collision performance becomes small.

In the floor panel in Patent Document 1, the recessed parts are arranged in the honeycomb shape and therefore large out-of-plane deformation in an oblique direction (a direction between the vehicle length direction and the vehicle width direction) is likely to occur, so that there is a room for improvement in terms of improving the collision performance.

The floor panel in Patent Document 2 is intended to reduce noise due to the vibration of the floor panel without increasing the rigidity of the floor panel. In other words, the technique disclosed in Patent Document 2 contradicts a technique of suppressing the occurrence of large out-of-plane deformation by increasing the rigidity of the floor panel.

The composite module-type energy absorbing assembly disclosed in Patent Document 3 is intended to absorb larger collision energy with a smaller weight and at a collision distance as short as possible. Patent Document 3 discloses a ratio (0.5 to 0.3) between a depth D and a diameter W and a ratio (0.2 to 0.7) between the diameter W and an interval S between the recessed parts as a constitution of the circular recessed part. Further, it is closed that a side surface inclination angle α of the recessed part is 0 to 45 degrees. However, the composite module-type energy absorbing assembly disclosed in Patent Document 3 is composed of a thermoplastic sheet (thermoplastic resin) partially plastically and partially elastically crushed, has a constitution in which the recessed parts are operatively coupled to each other, and therefore cannot be said to be a technique suitable for the panel member such as the floor panel of the automobile which should secure the collision performance.

Further, according to the study by the present inventors, when forming the recessed part in the panel member of the automobile, the recessed part is not necessarily circular, and it is considered that there is a room for further improvement in collision performance by specifying detailed constitution conditions such as size, number, arrangement or the like of recessed parts.

The present invention has been made in consideration of the above circumstances and its object is to improve the collision performance of a panel member of an automobile.

Means for Solving the Problems

An aspect of the present invention solving the above problem includes a plurality of circular or elliptical recessed parts linearly arranged, wherein: when it is assumed that a portion where three recessed parts are linearly aligned is called a recessed part group, there are at least a first recessed part group and a second recessed part group arranged in parallel with the first recessed part group; an angle formed between a first straight line linking a center of the recessed part in the first recessed part group and a center of the recessed part in the second recessed part group located at a position closest to the recessed part in the first recessed part, and, a second straight line linking centers of the recessed parts in the first recessed part group is 80 degrees or more and 100 degrees or less; the recessed part is composed of a bottom part constituting a bottom surface of the recessed part and a side wall part erected around the bottom part; and an inclination angle formed between the bottom part and the side wall part is 20 degrees or more and 90 degrees or less.

Effect of the Invention

It is possible to improve the collision performance of a panel member of an automobile.

EMBODIMENTS FOR CARRYING OUT THE INVENTION

Hereinafter, an embodiment of the present invention will be explained referring to the drawings. Note that in this description and the drawings, the same codes are given to components having substantially the same functional configurations to omit duplicated explanation.

Figure 1:
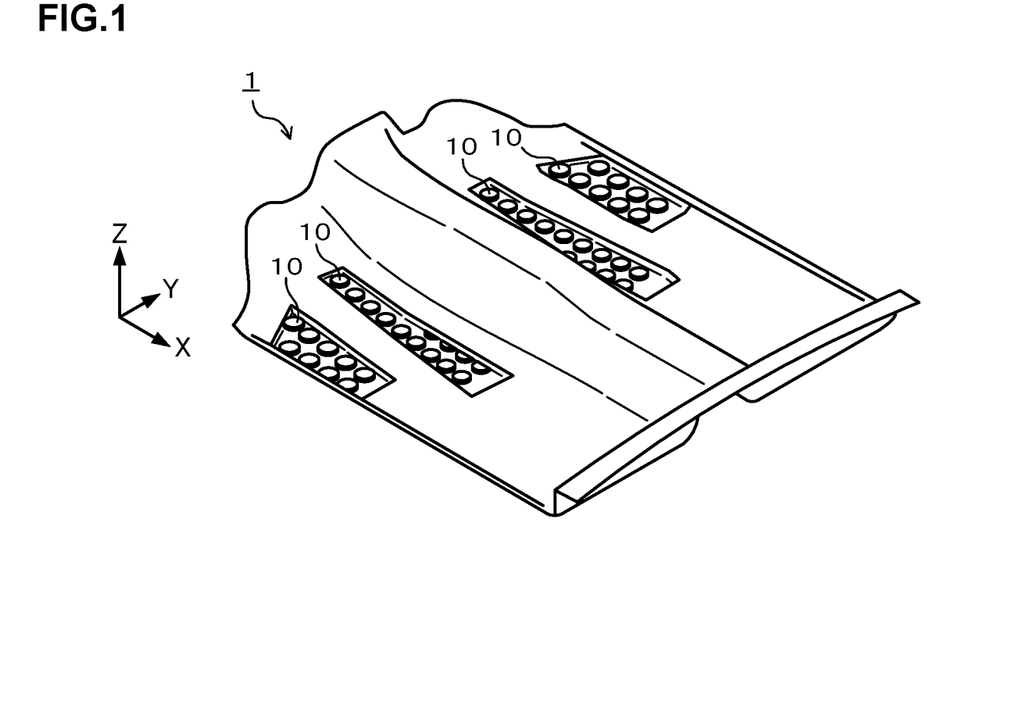
FIG. 1 is a view illustrating a schematic shape of a panel member according to an embodiment of the present invention.

FIG. 1 is a view illustrating a schematic shape of a panel member 1 in this embodiment. In FIG. 1, an X-direction is a vehicle length direction, a Y-direction is a vehicle width direction, and a Z-direction is a vehicle height direction, and the X-direction, the Y-direction, and the Z-direction are vertical to one another. As illustrated in FIG. 1, the panel member 1 in this embodiment has a plurality of recessed parts 10 provided along the X-direction. The recessed part 10 is in a circular shape in plan view. Note that the recessed part 10 may be in a shape recessed when viewed from a vehicle-interior side of the panel member 1 or may be in a shape recessed when viewed from a vehicle-exterior side. For example, when the panel member 1 is a floor panel, the recessed part 10 may be in a shape recessed when viewed from above or may be in a shape recessed when viewed from below. When the recessed part 10 is in a shape recessed when viewed from the vehicle-interior side, the recessed part 10 when viewed from the vehicle-exterior side is in a projecting shape.

The panel member 1 in this embodiment has a portion where one row of the recessed parts 10 linearly arranged is formed and a portion where two rows of them are formed. Note that the arrangement of the rows of the recessed parts 10 is not particularly limited but is appropriately changed according to the required collision performance, the shape of the panel member 1 (the floor panel in this embodiment) or the like. Further, the length of the row of the recessed parts 10 is not particularly limited but is appropriately changed according to the required collision performance, the shape of the panel member 1 (the floor panel in this embodiment) or the like. However, in the case of using the panel member 1 as a floor panel of an automobile, the row of the recessed parts 10 linearly arranged preferably has an arrangement configuration along the vehicle length direction of the automobile in terms of improving the collision performance.

The material of the panel member 1 according to this embodiment is arbitrary, and is preferably, for example, iron (including high tensile strength steel sheets), aluminum, CFRP or the like when it is used as the floor panel of the automobile.

Figure 2:
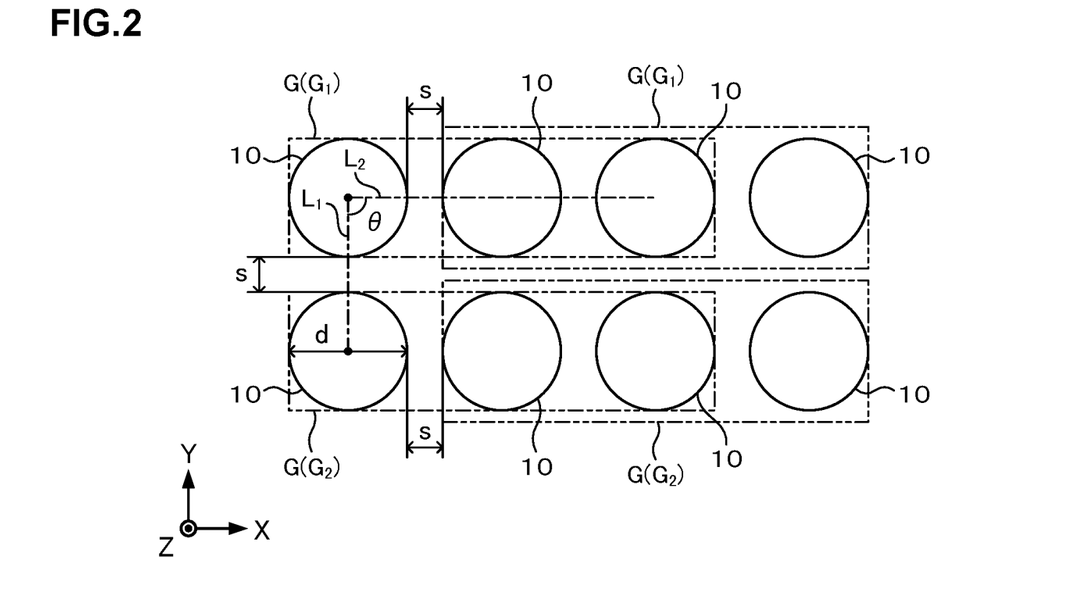
FIG. 2 is a view for explaining an arrangement of recessed parts of the panel member.

FIG. 2 is an enlarged view of a part where a plurality of rows of the recessed parts 10 are aligned, and is a view for explaining the arrangement of the recessed parts 10 of the panel member 1 in this embodiment. In this description, a portion where three recessed parts 10 are linearly aligned included in the panel member 1 is called a "recessed part group G". As illustrated in FIG. 2, in the case where a plurality of the recessed part groups G are arranged in parallel, an arbitrary recessed part group G is called a "first recessed part group $G_1$", and a recessed part group G arranged in parallel to the first recessed part group $G_1$ in a manner to be located adjacent to the first recessed part group $G_1$ is called a "second recessed part group $G_2$". In the example in FIG. 2, two rows each composed of four recessed parts 10 are illustrated, in which case two first recessed part groups $G_1$ exist in the X-direction, and two second recessed part groups $G_2$ also exist in the X-direction. In terms of improving the collision performance, it is preferable that a plurality of the first recessed part groups $G_1$ and a plurality of the second recessed part groups $G_2$ are arranged as in this embodiment.

Figure 3:
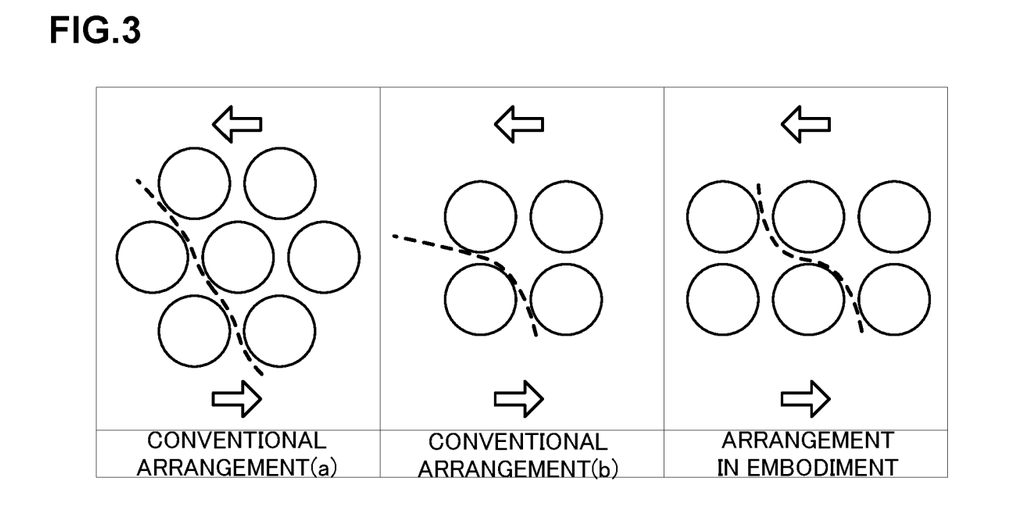
FIG. 3 is a view illustrating an out-of-plane deformation occurrence portion (broken line portion) of the panel member with respect to the arrangement of the recessed parts. An arrow in the drawing indicates a direction of a shear force.

Here, a case where a load in an axial direction is input into a side sill (not illustrated) joined with the panel member 1 is considered. FIG. 3 is a view illustrating an out-of-plane deformation occurrence portion with respect to the arrangement of the recessed parts 10 of the floor panel in this case. A broken line portion in FIG. 3 indicates the out-of-plane deformation occurrence portion, and an arrow in FIG. 3 indicates the direction of a shear force. A conventional arrangement (a) is an example in which the recessed parts 10 are arranged in a honeycomb shape, and a conventional arrangement (b) is an example in which four recessed parts 10 are arranged in a square shape.

In the case where the shear force occurs as illustrated in FIG. 3, the out-of-plane deformation is likely to occur along a direction (hereinafter, an "inclination direction") inclined with respect to the direction of the shear force in the panel member 1 in which the recessed parts 10 are arranged. The out-of-plane deformation occurs at a portion relatively low in rigidity of the panel member 1. In the case of the conventional arrangement (a), a portion low in rigidity, namely, a portion where the recessed part 10 is not formed continues in a wide region in the inclination direction, so that large out-of-plane deformation may occur along the inclination direction. When large shear buckling occurs with this out-of-plane deformation, the degree of contribution of the panel member 1 in terms of improving the collision performance decreases. Also in the case of the conventional arrangement (b), there are many portions low in rigidity in the inclination direction, the degree of contribution of the panel member 1 to improvement in collision performance is still low.

On the other hand, in the case of the arrangement of the recessed parts 10 in this embodiment, the first recessed part group $G_1$ and the second recessed part group $G_2$ are arranged in parallel, and therefore a portion low in rigidity does not continue in a wide region in the inclination direction, so that large out-of-plane deformation is less likely to occur. Thus, large shear buckling becomes less likely to occur in the panel member 1 at collision, thus making it possible to increase the resistance force against the collision in the panel member 1. As a result of this, the collision performance of the panel member 1 can be improved.

<Positional Relation Between the First Recessed Part Group $G_1$ and the Second Recessed Part Group $G_2$>

In order to cause the panel member 1 to function as above, the positional relation between the first recessed part group $G_1$ and the second recessed part group $G_2$ needs to satisfy predetermined conditions. In this description, a straight line linking a center of an arbitrary recessed part 10 in the first recessed part group $G_1$ and a center of the recessed part 10 in the second recessed part group $G_2$ closest to the recessed part 10 in plan view as illustrated in FIG. 2 is called a "first straight line $L_1$". Besides, a straight line linking centers of the recessed parts 10 in the first recessed part group $G_1$ in plan view is called a "second straight line $L_2$". The recessed parts 10 of the panel member 1 need to be arranged so that an angle θ formed between the first straight line $L_1$ and the second straight line $L_2$ is 80 degrees or more and 100 degrees or less. In the case where the angle θ satisfies this range, the occurrence of large out-of-plane deformation can be suppressed. Note that the angle θ formed between the first straight line $L_1$ and the second straight line $L_2$ is more preferably 85 degrees or more. Further, the angle θ formed between the first straight line $L_1$ and the second straight line $L_2$ is more preferably 95 degrees or less.

<Distance Between the Recessed Parts>

Figure 4:
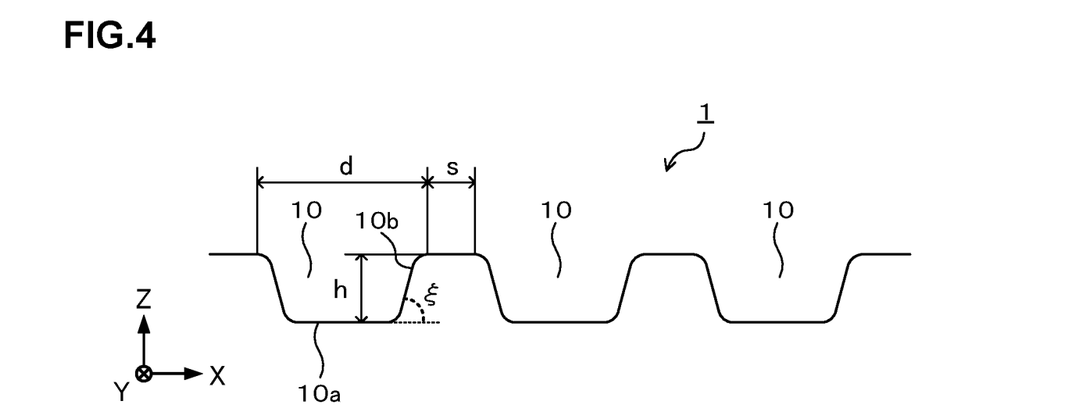
FIG. 4 is a cross-sectional view of the panel member cut to include centers of the recessed parts adjacent to each other.

FIG. 4 is a cross-sectional view of the panel member 1 cut to include the centers of the recessed parts 10 adjacent to each other. In this description, the distance between the recessed parts 10 is expressed by s, the diameter of the recessed part 10 is expressed by d, and the depth of the recessed part 10 is expressed by h. The distance s between the recessed parts 10 is a length of a plane of the panel member 1 where the recessed part 10 is not formed (a length from an R end of one ridge line part to an R end of the other ridge line part) in the cross section cut to include the centers of the adjacent recessed parts 10 as in FIG. 4. Hereinafter, the plane where the recessed part 10 is not formed is assumed to be a "reference plane". The inter-recessed part distance s is appropriately changed according to the required collision performance, the shape of the panel member 1 or the like, and a distance between the adjacent recessed parts 10 in the first recessed part group $G_1$ and a distance between the adjacent recessed parts 10 in the second recessed part group $G_2$ each preferably satisfy s≤3 d/10. When the distance s between the recessed parts 10 is 3 d/10 or less, the effect of suppressing the occurrence of the large out-of-plane deformation can be enhanced.

Further, it is preferable that the adjacent recessed parts 10 are separated from each other in the reference plane in FIG. 4. Here, "being separated from each other" means that there is no bridge portion or other coupling portion. If the recessed parts 10 are coupled to each other by the coupling portion such as the bridge portion, the length of the side wall (side wall part 10b) of the recessed part 10 decreases by a length corresponding to the coupling portion, thus decreasing the effect of suppressing the occurrence of the large out-of-plane deformation.

Further, it is preferable that in the panel member 1, the distance s between the recessed part 10 in the first recessed part group $G_1$ and the recessed part 10 in the second recessed part group $G_2$ also satisfies 3 d/10 or less. Note that the "inter-recessed part distance s" when calculating the distance between the recessed part 10 in the first recessed part group $G_1$ and the recessed part 10 in the second recessed part group $G_2$ means the distance between an arbitrary recessed part 10 in the first recessed part group $G_1$ and a recessed part 10 in the second recessed part group $G_2$ located at a position closest to the recessed part 10.

In this embodiment, the distances s between the recessed parts 10 in the first recessed part group $G_1$ are equal to one another, but the distances s between the recessed parts 10 may be different from one another. Further, in this embodiment, the distances s between the recessed parts 10 in the second recessed part group $G_2$ are equal to one another, but the distances s between the recessed parts 10 may be different from one another. Further, in this embodiment, the distances s between the recessed parts 10 in the first recessed part group $G_1$ and the recessed parts 10 in the second recessed part group $G_2$ are equal to one another, but the distances s between the recessed parts 10 may be different from one another. In any case, when the relation between the inter-recessed part distance s and the diameter d of the recessed part 10 satisfies s≤3 d/10, the effect of suppressing the occurrence of the large out-of-plane deformation can be enhanced. The distance s between the recessed parts 10 is preferably, for example, 5 mm or more, and preferably equal to or less than the diameter d of the recessed part 10.

Note that in this embodiment, the diameters d of the recessed parts 10 provided in the panel member 1 are equal to one another, but the diameters d of the recessed parts 10 may be different from one another. In this case, the "diameter d of the recessed part 10" used when calculating the relation between the distance s between the adjacent recessed parts 10 and the diameter d of the recessed part 10 is an average value of the diameters of the adjacent recessed parts 10. The value of the diameter d of the recessed part 10 is appropriately changed according to the space around the panel member 1 or the formability of the panel member 1, and is preferably, for example, 3 mm or more and 100 mm or less. Further, the depths h of the recessed parts 10 may be similarly different from one another. The depth h of the recessed part 10 is preferably 3 mm or more, and more preferably 5 mm or more. Further, the depth of the recessed part 10 is preferably 30 mm or less.

<Inclination Angle of the Side Wall Part of the Recessed Part>

Further, as illustrated in FIG. 4, the recessed part 10 according to this embodiment is composed of a bottom part 10a constituting a bottom surface of the recessed part and the side wall part 10b erected around the bottom part 10a. An angle formed between the bottom part 10a and the side wall part 10b (hereinafter, an inclination angle ξ of the side wall part) is 20 degrees or more and 90 degrees or less, more preferably 45 degrees or more and 90 degrees or less, and furthermore preferably 60 degrees or more. As the inclination angle ξ is an angle closer to 90 degrees, the collision performance of the panel member 1 is improved more. However, it is difficult, in terms of manufacturing members, to constitute the angle to be 90 degrees, and therefore the inclination angle is designed to a preferable angle of 20 degrees or more and 90 degrees or less.

An embodiment of the present invention has been explained above, but the present invention is not limited to the embodiments. It should be understood that various changes and modifications are readily apparent to those skilled in the art within the scope of the technical spirit as set forth in claims, and those should also be covered by the technical scope of the present invention.

Figure 5:
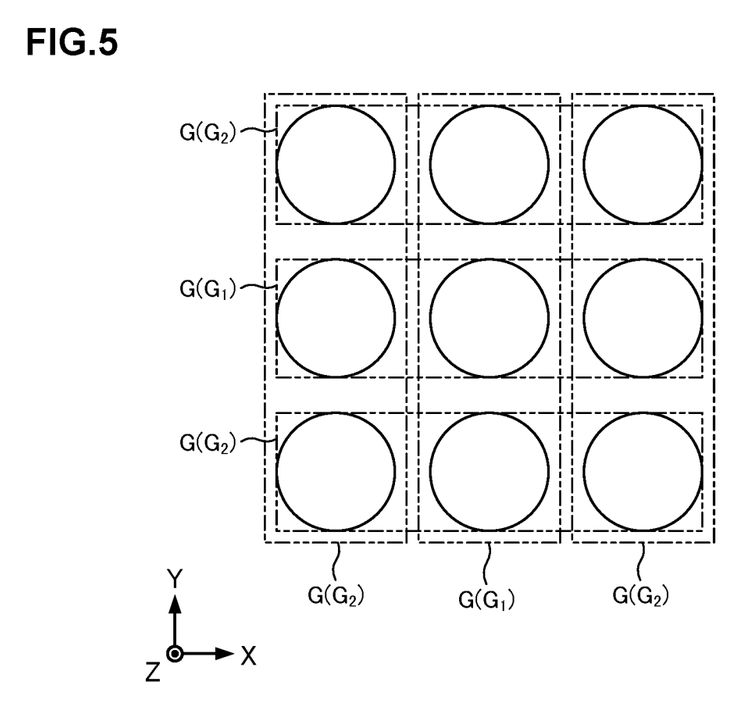
FIG. 5 is a view illustrating an arrangement example of the recessed parts.

For example, though the two rows of the recessed parts 10 are arranged in parallel in the embodiment to form the first recessed part group $G_1$ and the second recessed part group $G_2$ along the X-direction, for example, three rows of the recessed parts 10 may be aligned in parallel as illustrated in FIG. 5 to form the first recessed part group $G_1$ and the second recessed part group $G_2$ also in the Y-direction. This can enhance the effect of suppressing the occurrence of the out-of-plane deformation due to the shear force. Besides, though the floor panel is explained as an example of the panel member 1 of the automobile in the above embodiment, the panel member 1 is not limited to the floor panel but may be, for example, a roof panel, a hood inner panel, a back door inner panel or the like. Note that a preferable direction (for example, the vehicle length direction, the vehicle width direction, the vehicle height direction or the like) as the direction in which the first recessed part group $G_1$ and the second recessed part group $G_2$ are formed is appropriately changed according to the place to which the panel member 1 is applied.

Further, it has been explained that the recessed part 10 may be in a shape recessed when viewed from the vehicle-interior side of the panel member 1 or may be in a shape recessed when viewed from the vehicle-exterior side in the above embodiment, but the recessed parts 10 may have such a configuration that a recessed shape and a projecting shape when viewed from vehicle-interior side exist in a mixed manner. In this case, the dimensions and configurations of the recessed shape when viewed from the vehicle-interior side and the projecting shape when viewed from the vehicle-exterior side only need to satisfy the conditions explained in the above embodiment.

Besides, the recessed part 10 has been explained to be in a circular shape in plan view in the above embodiment, but does not always need to be in a perfect circular shape but may be in an almost circular shape or an elliptical shape in plan view. In the case where the recessed part 10 is in an elliptical shape and it is assumed that a major axis of the ellipse is a and a minor axis is b, the value of b/a being a minor/major axis ratio is preferably designed to ⅓ or more and 2 or less, and more preferably designed to ½ or more and 2 or less. Note that in the case where the recessed part 10 in an elliptical shape, the diameter d of the recessed part explained in the above embodiment only needs to be an average diameter of the minor axis a and the major axis b.

EXAMPLES

Example 1

An analysis model of a vehicle body including the floor panel in FIG. 1 being an example of the present invention was created, and subjected to a simulation simulating the Small Over Lap test. The floor panel of the analysis model has a depth of the recessed part of 5 mm and a diameter of the recessed part of 64 mm. Further, the inter-recessed part distance in the first recessed part group, the inter-recessed part distance in the second recessed part group, and the distance between the recessed part in the first recessed part group and the recessed part in the second recessed part group are each 14 mm. The angle θ (FIG. 2) formed between the first straight line and the second straight line indicating the positional relation between the first recessed part group and the second recessed part group is 90 degrees. Note that an analysis model in which the recessed part is not provided with respect to the analysis model in the above inventive example was created as a comparative example, and subjected to a simulation under the same conditions. Further, an analysis model in the case of an angle θ of 60 degrees was created as a comparative example, and subjected to a simulation under the same conditions. In the analysis model of the vehicle body, the vehicle width was set to 170 mm and the vehicle length was set to 250 mm.

Figure 6:
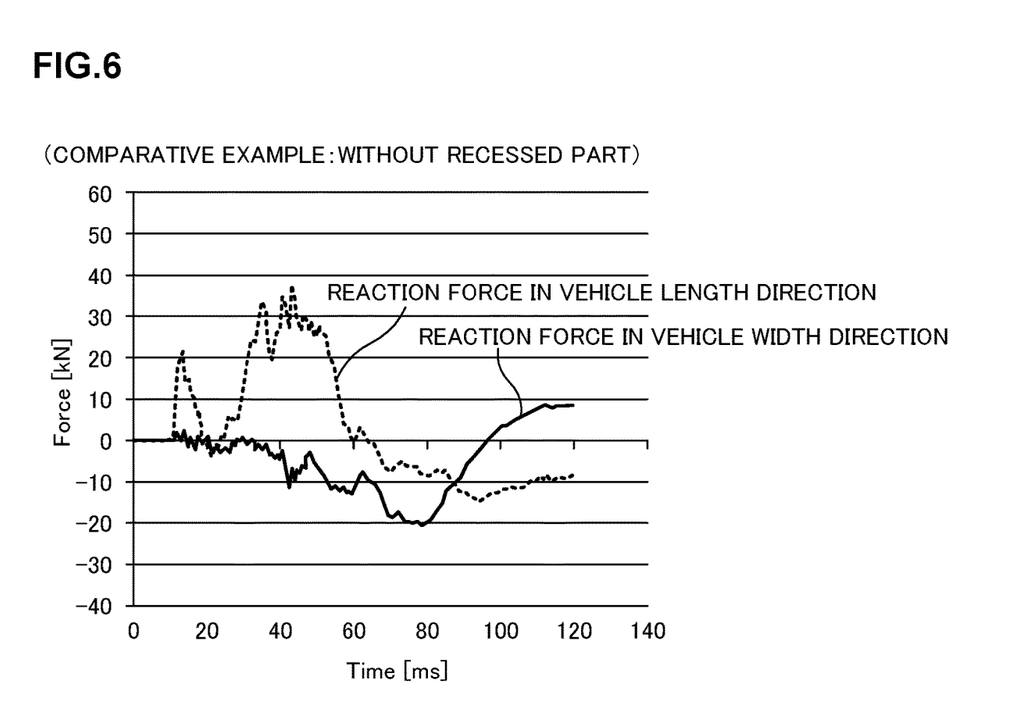
FIG. 6 is a chart illustrating the history of reaction forces occurring in a floor panel in a collision simulation in a comparative example.
Figure 7:
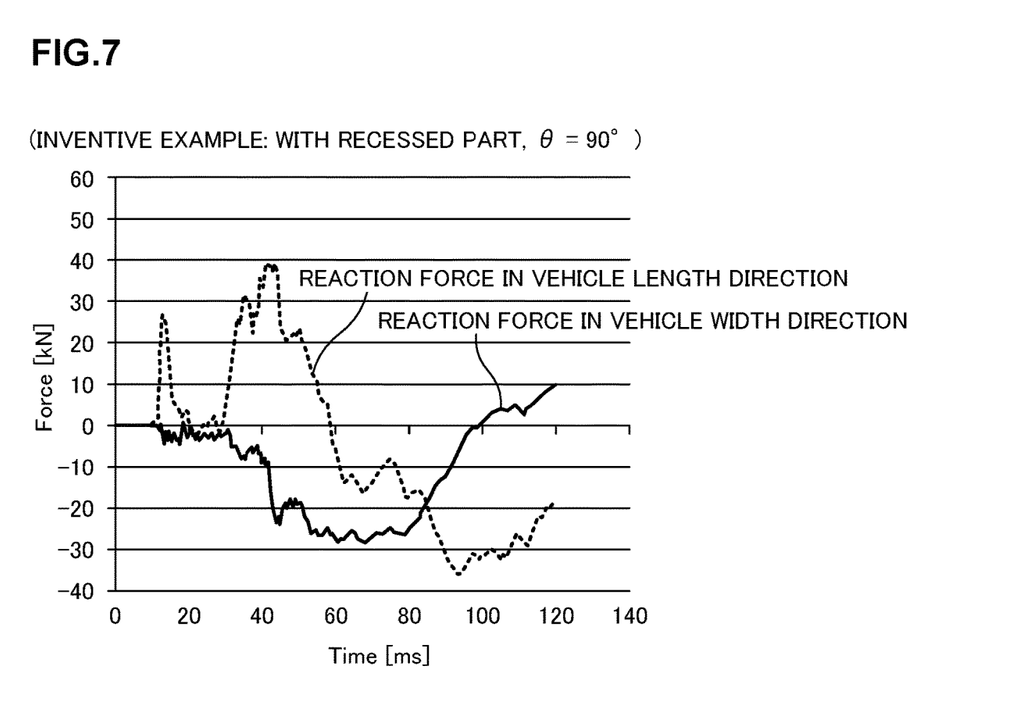
FIG. 7 is a chart illustrating the history of reaction forces occurring in a floor panel in a collision simulation in an inventive example.

FIG. 6 is a chart illustrating the history of a stress resultant (reaction force) of a floor including a frame occurring at collision of an impactor in the simulation in the comparative example. Besides, FIG. 7 is a chart illustrating the history of a similar reaction force occurring at collision of an impactor in the simulation in the inventive example. On the vertical axis in FIG. 6 and FIG. 7, the magnitude of the reaction force in a minus region indicates a resistance force against the collision. Note that the history of a load due to the collision reached the floor panel was indicated at 60 ms or later at Time indicated on the horizontal axis in each chart (FIG. 6 to FIG. 8) according to this example.

Figure 8:
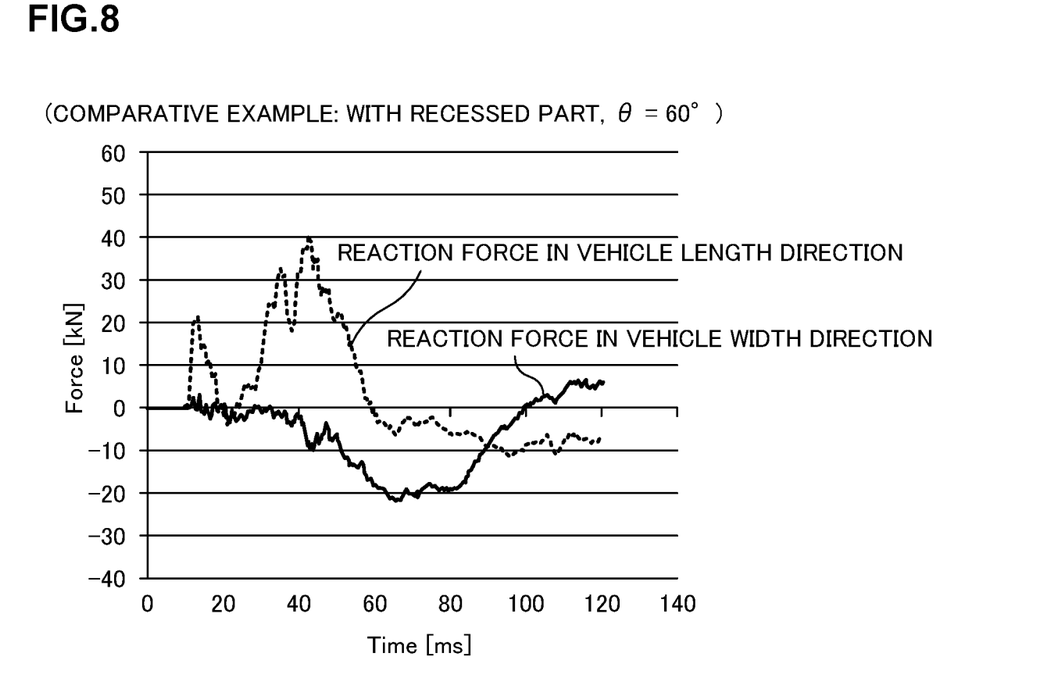
FIG. 8 is a chart illustrating the history of reaction forces occurring in a floor panel in a collision simulation in a comparative example.

According to the results in FIG. 6 and FIG. 7, the magnitudes of the reaction forces in the vehicle length direction and the vehicle width direction are larger in the inventive example than in the comparative example. In other words, arranging the recessed parts as in the inventive example can increase the resistance force against the collision as the panel member to increase the energy absorption amount. Besides, FIG. 8 illustrates the simulation result in the case where the angle θ is 60 degrees, and arranging the recessed parts as in the inventive example can increase the maximum reaction force to improve the collision performance as is clear from the comparison between FIG. 7 and FIG. 8.

Figure 9:
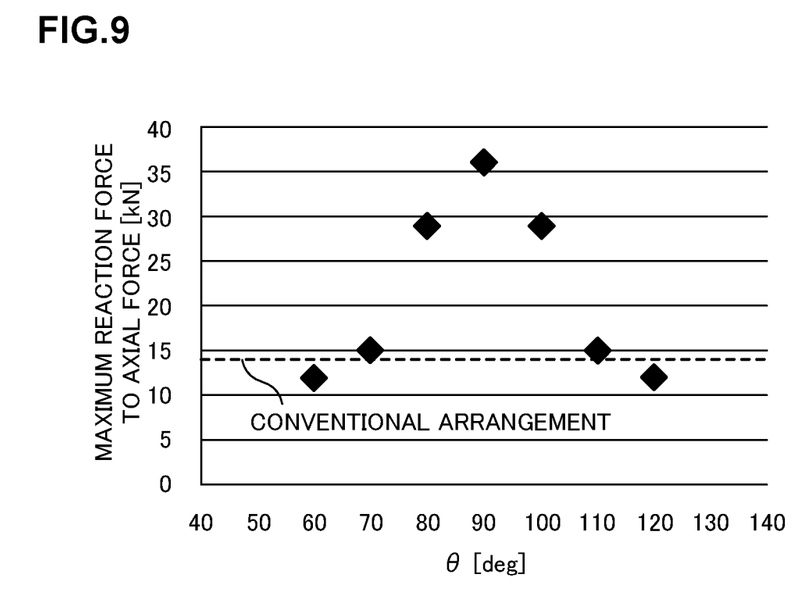
FIG. 9 is a chart illustrating simulation results when an angle θ is changed.

Next, a plurality of analysis models different in angle θ were created and subjected to a simulation under the same conditions as those of the above simulation. FIG. 9 is their simulation results. As illustrated in FIG. 9, when the angle θ falls with a range of 80 degrees or more and 100 degrees or less, the maximum reaction force with respect to the axial force becomes larger than that in the conventional arrangement of the recessed parts to improve the collision performance.

Figure 10:
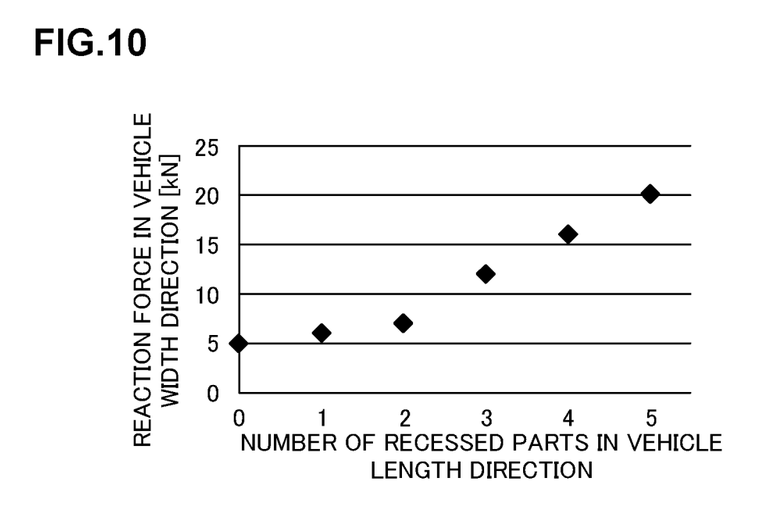
FIG. 10 is a chart illustrating a relation between the number of the recessed parts of the floor panel in a vehicle length direction and the reaction force occurring in the floor panel in a vehicle width direction.

Next, a plurality of analysis models different in number of recessed parts in the vehicle length direction of the floor panel were created and subjected to a simulation under the same conditions as those of the above simulation. Their simulation results are illustrated in FIG. 10. Note that the analysis model in which the number of recessed parts is three or more illustrated in FIG. 10 is a model having the "recessed part group" according to the present invention, and has the first recessed part group and the second recessed part group. As illustrated in FIG. 10, the reaction force in the vehicle width direction in the case where there are three recessed parts in the vehicle length direction is almost twice as much as that in the case where there are two recessed parts, thus providing a significant effect.

Example 2

Figure 11:
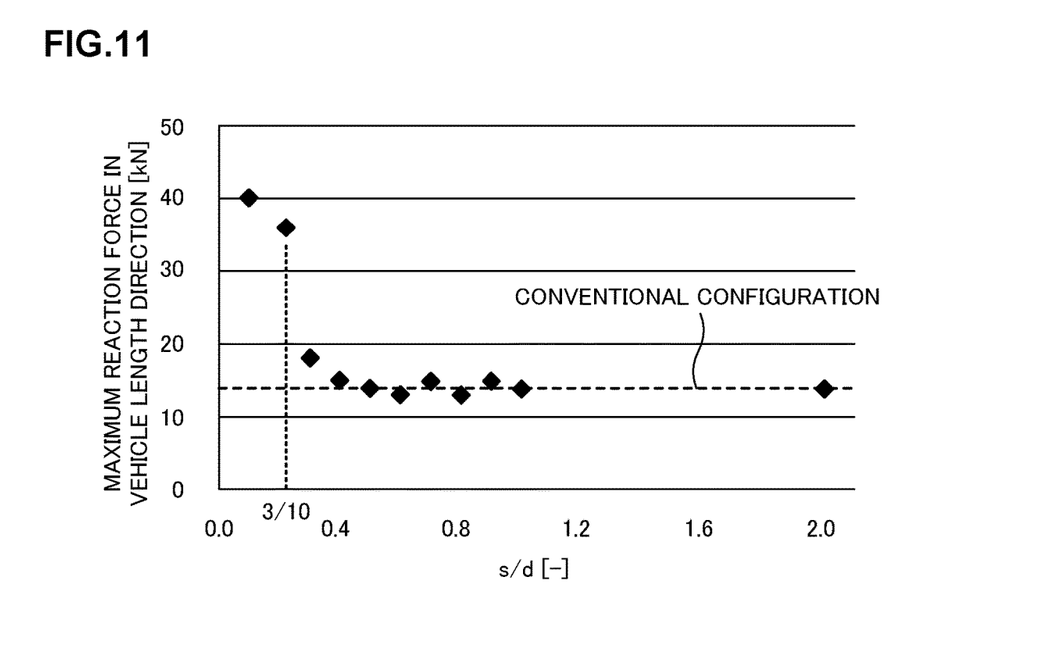
FIG. 11 is a chart illustrating a relation between a value of s/d and a maximum reaction force in the vehicle length direction.

Besides, FIG. 11 is a chart illustrating the relation between the value of s/d and the maximum reaction force in the vehicle length direction, and is a graph of the analysis results using the same analysis models as in the above Example 1. In addition, the analysis results in this example are listed in the following Table 1.

TABLE 1

| | s [mm] | d [mm] | s/d | MAXIMUM REACTION FORCE IN VEHICLE LENGTH DIRECTION [kN] |
|---|---|---|---|---|
| INVENTIVE EXAMPLE 1 | 7 | 74 | 0.1 | 40 |
| INVENTIVE EXAMPLE 2 | 14 | 64 | 0.22 | 36 |
| INVENTIVE EXAMPLE 3 | 18 | 59 | 0.3 | 18 |
| INVENTIVE EXAMPLE 4 | 21 | 53 | 0.4 | 15 |
| INVENTIVE EXAMPLE 5 | 24 | 49 | 0.5 | 14 |
| INVENTIVE EXAMPLE 6 | 27 | 45 | 0.6 | 13 |
| INVENTIVE EXAMPLE 7 | 29 | 42 | 0.7 | 15 |
| INVENTIVE EXAMPLE 8 | 31 | 39 | 0.8 | 13 |
| INVENTIVE EXAMPLE 9 | 33 | 36 | 0.9 | 15 |
| INVENTIVE EXAMPLE 10 | 34 | 34 | 1 | 14 |
| INVENTIVE EXAMPLE 11 | 43 | 21 | 2 | 14 |

As illustrated in FIG. 11, when the value of s/d exceeds 0.3, the maximum reaction force in the vehicle length direction significantly decreases. This shows that in the case where the distance s between the recessed parts 10 is 3 d/10 or less, the occurrence of the large out-of-plane deformation as explained above referring to FIG. 3 is suppressed, resulting in that the maximum reaction force in the vehicle length direction, namely, the resistance force against the collision increases. From the analysis results, it can be said that the relation between the inter-recessed part distance s and the diameter d of the recessed part preferably satisfies s≤3 d/10 as explained in the above embodiment.

Example 3

Figure 12:
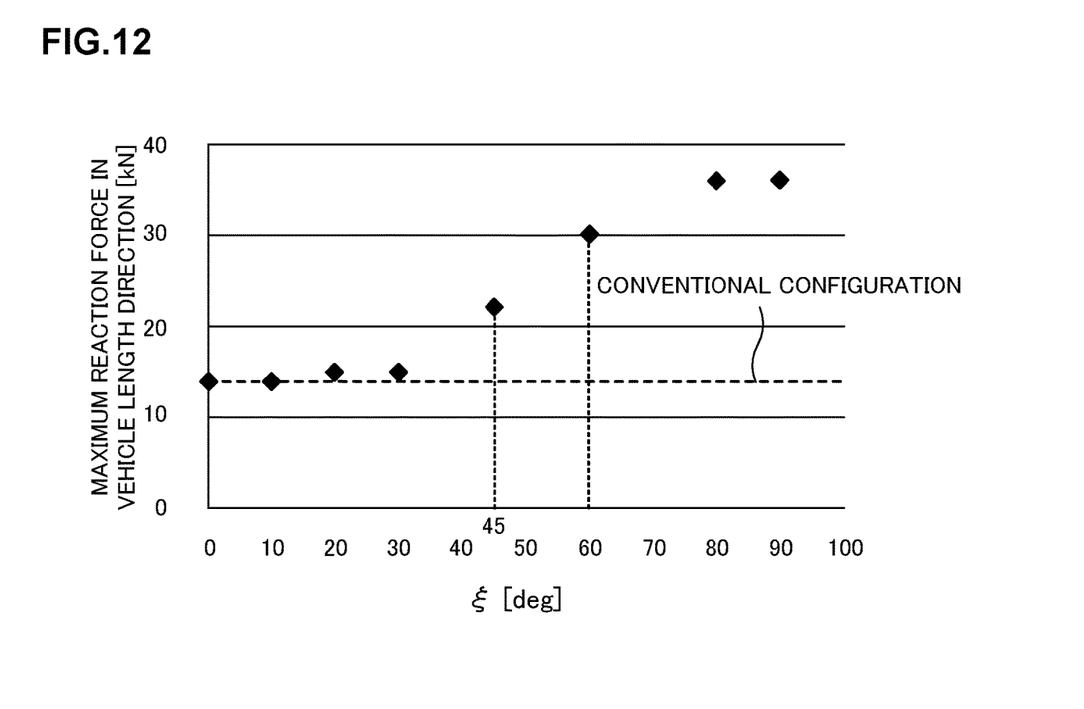
FIG. 12 is a chart illustrating a relation between an inclination angle ξ and the maximum reaction force in the vehicle length direction.

Besides, FIG. 12 is a chart illustrating the relation between the inclination angle ξ and the maximum reaction force in the vehicle length direction, and is a graph of the analysis results using the same analysis models as in the above Example 1. In addition, the analysis results in this example are listed in the following Table 2.

TABLE 2

| | ξ [deg] | MAXIMUM REACTION FORCE IN VEHICLE LENGTH DIRECTION [kN] |
|---|---|---|
| COMPARATIVE EXAMPLE 1 | 0 | 14 |
| COMPARATIVE EXAMPLE 2 | 10 | 14 |
| INVENTIVE EXAMPLE 12 | 20 | 15 |
| INVENTIVE EXAMPLE 13 | 30 | 15 |
| INVENTIVE EXAMPLE 14 | 45 | 22 |
| INVENTIVE EXAMPLE 15 | 60 | 30 |
| INVENTIVE EXAMPLE 16 | 80 | 36 |
| INVENTIVE EXAMPLE 17 | 90 | 36 |

As illustrated in FIG. 12, the maximum reaction force in the vehicle length direction slightly increases when the inclination angle ξ is 20 degrees or more, the maximum reaction force in the vehicle length direction increases when the inclination angle ξ is 45 degrees or more, and the maximum reaction force in the vehicle length direction more significantly increases when the inclination angle ξ is 60 degrees or more. From the analysis results, it can be said that the inclination angle ξ formed between the bottom part and the side wall part of the recessed part according to the present invention is preferably 20 degrees or more, more preferably 45 degrees or more, and furthermore preferably 60 degrees or more as explained in the above embodiment.

Example 4

Figure 13:
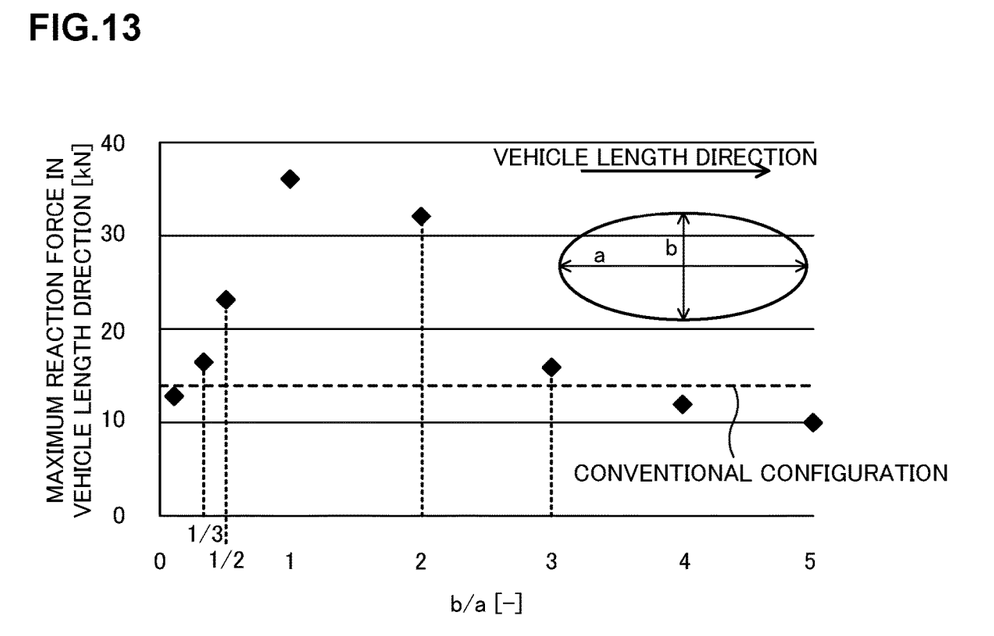
FIG. 13 is a chart illustrating a relation between a minor/major axis ratio b/a and the maximum reaction force in the vehicle length direction.

Besides, FIG. 13 is a chart illustrating the relation between the minor/major axis ratio b/a and the maximum reaction force in the vehicle length direction in the case where the recessed part shape is in an elliptical shape in plan view in the same analysis model as in the above Example 1. In addition, the analysis results in this example are listed in the following Table 3. In the floor panel of the analysis model in this example, the major axis of the recessed part was the vehicle length direction and the minor axis was the vehicle width direction.

TABLE 3

| | a [mm] | b [mm] | b/a | MAXIMUM REACTION FORCE IN VEHICLE LENGTH DIRECTION [kN] |
|---|---|---|---|---|
| INVENTIVE EXAMPLE 18 | 55 | 5.5 | 0.1 | 13 |
| INVENTIVE EXAMPLE 19 | 75.1 | 25 | 0.333 | 16.5 |
| INVENTIVE EXAMPLE 20 | 76 | 38 | 0.5 | 23 |
| INVENTIVE EXAMPLE 21 | 64 | 64 | 1 | 36 |
| INVENTIVE EXAMPLE 22 | 32 | 64 | 2 | 32 |
| INVENTIVE EXAMPLE 23 | 21.3 | 64 | 3 | 16 |
| INVENTIVE EXAMPLE 24 | 16 | 64 | 4 | 12 |
| INVENTIVE EXAMPLE 25 | 12.8 | 64 | 5 | 10 |

As illustrated in FIG. 13, it is found that in the case where the design of the recessed part shape is made such that the minor/major axis ratio b/a is set to ⅓ or more and 2 or less, the maximum reaction force in the vehicle length direction is larger than that in the prior art and, in particular, when b/a is set to ½ or more and 2 or less, the maximum reaction force in the vehicle length direction is much larger. From the analysis results, it can be said that in the case where the shape of the recessed part according to the present invention is in an elliptical shape in plan view, the minor/major axis ratio b/a is preferably designed to ⅓ or more and 2 or less and is more preferably designed to ½ or more and 2 or less as explained in the above embodiment.

INDUSTRIAL APPLICABILITY

The present invention is usable as a panel member such as a floor panel, a roof panel, a hood inner panel, a back door inner panel or the like.

EXPLANATION OF CODES 1 panel member
10 recessed part
d diameter of recessed part
h depth of recessed part
G recessed part group
$G_1$ first recessed part group
$G_2$ second recessed part group
$L_1$ first straight line
$L_2$ second straight line
s inter-recessed part distance
θ angle formed between first straight line and second straight line
ξ angle formed between bottom part and side wall part of recessed part (inclination angle)

What is claimed is:

1. A panel member comprising
a plurality of circular or elliptical recessed parts linearly arranged, wherein:
when it is assumed that a portion where three recessed parts are linearly aligned is called a recessed part group, there are at least a first recessed part group and a second recessed part group arranged in parallel with, and adjacent to, the first recessed part group;
an angle formed between a first straight line linking a center of a recessed part in the first recessed part group and a center of a recessed part in the second recessed part, group located at a position closest to the recessed part in the first recessed part, and, a second straight line linking centers of the recessed parts in the first recessed part group is 80 degrees or more and 100 degrees or less;
each recessed part is composed of a bottom part constituting a bottom surface of the recessed part and a side wall part erected around the bottom part; and
an inclination angle ξ formed between the bottom part and the side wall part is 20 degrees or more and 90 degrees or less;
wherein, when it is assumed that a diameter or an average diameter of each recessed part is d and a distance between the recessed parts adjacent to each other is s, a distance between the adjacent recessed parts in the first recessed part group, a distance between the adjacent recessed parts in the second recessed part group, and a distance between the recessed part in the first recessed part group and the recessed part in the second recessed part group each satisfy 5≤s≤3 d/10 in terms of mm.

2. The panel member according to claim 1, wherein the inclination angle ξ is 45 degrees or more and 90 degrees or less.

3. The panel member according to claim 1, wherein when the recessed parts are elliptical, a ratio b/a between a major axis a and a minor axis b of the elliptical shape is ⅓ or more and 2 or less.

4. The panel member according to claim 1, wherein the panel member is a floor panel of an automobile, and the recessed parts are configured such that the recessed part groups in which the three recessed parts are linearly aligned are arranged along a vehicle length direction of the automobile.

* * * * *